Patented May 5, 1942

2,282,057

UNITED STATES PATENT OFFICE 2,282,057

PURIFICATION AND STABILIZATION OF POLYVINYL ACETAL RESINS

John H. Hopkins and George H. Wilder, Arlington, N. J., assignors to E. I. du Pont de Nemours & Company, Wilmington, Del., a corporation of Delaware No Drawing. Application April 29, 1939, Serial No. 270,741

11 Claims. (Cl. 260—73)

This invention relates to the purification and stabilization of polyvinyl acetal resins and, more particularly, to a method of improving the clarity, color, and resistance to heat and light of such resins.

Polyvinyl acetal resins are resinous products prepared by condensing with aldehydes or ketones, in the presence of an acid catalyst, either all or part of the hydroxyl groups of polyvinyl alcohol or of an incompletely hydrolyzed polyvinyl ester. The term "polyvinyl acetal" is used herein in its broader sense to include the resins prepared by condensation with ketones and known specifically as "ketals" and the resins prepared by condensation with aldehydes and known specifically as "acetals," using that term in its narrower sense.

The polyvinyl acetals are conventionally made by a process in which condensation of the aldehyde or ketone with the hydroxyl groups of the polyvinyl alcohol takes place in the presence of an acid catalyst; usually an organic solvent medium is employed and the acetals formed are recovered by precipitating them from the solvent medium through the addition of water. The finely divided crude resins obtained in this manner contain residues of the acid catalyst and residues of aldehydes or ketones which greatly impair their color and clarity and their resistance to light and heat.

An object of the present invention is to provide a method of purifying and stabilizing crude polyvinyl acetal resins. A further object is to provide a method of obtaining polyvinyl acetal resins of greatly improved color and clarity. A still further object is to provide a method of obtaining polyvinyl acetal resins of greater resistance to light and heat than those known heretofore. Another object of the invention is to provide a simple, economical, and effective method of purifying polyvinyl acetal resins in finely divided form without agglomeration of the particles of resin during the subsequent drying. A still further object is to provide for the removal of residues of acid catalysts and residues of aldehydes or ketones from crude polyvinyl acetal resins.

A further object of the invention is to provide new and improved polyvinyl acetal resins characterized by their stability and improved resistance to deterioration due to heat and light. A particular object is to provide a new and improved polyvinyl butyral resin. Other objects of the invention will be apparent from the description given hereinafter.

The above objects are accomplished according to the present invention by steeping the crude polyvinyl acetal resin in finely divided form in a steeping liquid, comprising a mixture of water and a water-miscible solvent for the resin and an alkaline substance dissolved therein, under active agitation and at a temperature adapted to effect softening and swelling of the resin in the steeping liquid and to cause agglomeration in the absence of agitation but not in the presence of active agitation, said temperature not to exceed 60° C., washing the resin with water to remove solvent therefrom and leave the resin in equilibrium with water of a pH of no less than 7.5 and, normally, between 7.5 and 10.0 and, thereafter, drying the resin.

The process of the present invention is most conveniently applied to the crude polyvinyl acetal resin as precipitated from the organic solvent medium in which it is made. Conventionally, water is added to the reaction medium thereby effecting a precipitation of the resin in a finely divided state. The resin may be obtained in other ways, if desirable, but should be in a relatively finely divided state for the present purification and stabilization method to be effective.

The alkaline substances most suitable for use in the steeping liquid are those sufficiently soluble and sufficiently dissociated in water and which are stable and substantially non-volatile at the temperature of the process and which do not give rise to by-products harmful to the quality or stability of the resin nor by action on the resin or by presence therein cause discoloration or other impairment of quality. Among the alkaline substances preferred for this purpose may be mentioned the alkali metal hydroxides and tertiary amines such as triethanol amine, diethyl cyclohexyl amine, dimethyl cyclohexyl amine. Ammonium hydroxide is not desirable because of its volatility and its effect on the color of the resin while alkaline earth hydroxides are undesirable because of their formation of insoluble salts with sulfuric acid which is commonly present in the resin as catalyst. The selection of alkaline substances not specifically disclosed herein but adapted for use in the steeping liquid will be a matter of no difficulty for those skilled in the art.

The amount of alkaline substance in the steeping liquid should be sufficient to neutralize the acid residues in the resin and it has been found that the pH of the steeping liquid should be above 7.5 and is advantageously maintained at from 9.0–10.0, particularly in the early part of the treatment.

With regard to the alkalinity of the steeping liquid, a determination of pH in the presence of solvent by indicators calibrated for aqueous solution leads to somewhat erroneous results. The error is, however, not sufficient to be of practical influence in the conduct of the steeping operation and, accordingly, the apparent pH thus determined is acceptable for present purposes.

While the degree of softening of the finely divided particles of resin which is advantageous in the process of the present invention cannot be stated in absolute terms, as would be possible if pieces of gross size were involved, it can be readily recognized by actual tests. The conditions, namely, the composition of the steeping liquid and the temperature of steeping, are satisfactory when the resin particles being treated will agglomerate in the absence of agitation but will not agglomerate when undergoing active agitation.

It will be obvious to those skilled in the art that the specific conditions of temperature and composition of the steeping liquid must necessarily depend to some extent upon the nature of the polyvinyl acetal resin and upon its previous treatment, particularly as that influences its content of solvent. When the polyvinyl acetal resin is precipitated from the reaction batch by admixture with water, the freshly precipitated particles contain appreciable proportions of the solvent in which the resin has been prepared. Subsequent rinsing of the precipitated resin with fresh water, or even any prolonged contact of it with water or with relatively dilute solvent, causes a diminution, by extraction, of the solvent content of the resin particles. Manifestly, the conditions required to effect the desired softening of these resin particles will, in general, be milder as the content of solvent remaining in the particles is greater.

Among the water-miscible solvents particularly adapted for use in the steeping liquid may be mentioned the lower aliphatic alcohols and ketones, and dioxan. Other water-miscible solvents may be used but the more economical and practical solvents are included within the above group. The proportion of the water-miscible solvent in the steeping liquid will vary under specific conditions but ordinarily will range between 40% and 60%, by weight, for operation at room temperature but may be reduced for operation at higher temperatures although not to less than 25%, by weight of the steeping liquid, because at the maximum temperature considered feasible, i. e., 60° C., stabilization would require too long a steeping period for economical operation.

Methanol has been found to be particularly well adapted for use as the water-miscible solvent in the steeping liquid and, in order to obtain stability in a minimum length of time, a relatively concentrated aqueous methanol steeping liquid should be used. A steeping liquid which comprises 50–60%, by weight thereof, of methanol is preferred with the steeping liquid maintained at a temperature of 45–55° C.

The duration of contact of the resin with the steeping liquid must be sufficient to insure the desired stabilization. What the minimum time will be is influenced by the particle size of the resin, the particular steeping liquid employed, the temperature of the treatment, and the like. For a given set of conditions, the proper minimum duration of the treatment will be determined upon the basis of actual performance. To this end, samples of the slurry of resin and steeping liquid, containing about 25 grams of resin, are removed at suitable intervals and subjected to a rinsing treatment identical with that which is to be applied to the batch as a whole, then dried and subjected to a test for stability.

A convenient test for stability of the resin is to place about 2 grams of the finely divided dried resin upon a piece of glass and heat same at 125° C. in an oven supplied with air circulation. At the end of 4 hours, the heated sample is compared with the original unheated material. The stability is satisfactory if no change in color has resulted from the heating.

While the function of each component of the steeping liquid is complex, the alkaline substance has the obvious purpose of neutralizing the acid residues in the resin. Further, it has been found that the alkaline substance in the steeping liquid also, unexpectedly, reduces the tendency of the resin particles to agglomerate so that, when subjected to active agitation, the resin particles may be so softened and swollen, without danger of agglomeration, that the neutralizing action of the alkaline substance and the penetration of the resin particles by the constituents of the steeping liquid are promoted to an extraordinary degree. The combined water and water-miscible solvent for the resin have the function, manifestly, of softening and swelling the resin particles to facilitate penetration of the particles by the constituents of the steeping liquid. The water also leaches from the resin some part of the acid residues and, also, the salts formed by neutralization of the acid by the alkaline substance. The solvent-water mixture additionally leaches from the resin its residues of aldehyde or ketone.

Following the steeping treatment described above, the steeping liquid is drained off and the resin rinsed until the water-miscible solvent is substantially removed, that is, until the amount of water-miscible solvent in the supernatant liquid in equilibrium with the resin has been reduced to not more than about 5%, by weight. This rinsing may be accomplished by the use of water or by the use of progressively weaker mixtures of the solvent with water, and finally of water.

It has been discovered that the resistance of the resin to light and heat is surprisingly increased if the rinsing of the resin after the steeping treatment is carried out under conditions such that a residue of an alkaline substance is left associated with the resin in such amount that the resin will be in equilibrium with water of a pH of at least 7.5 and not greater than about 10.0, preferably between 7.5 and 9.0. This may be done either by not removing all of the alkaline substance absorbed by the resin in the steeping treatment or by introducing an alkaline substance in the rinsing water, conveniently at the last rinse.

The alkaline substance to be used at this point will be selected upon the same general considerations as that used in the steeping liquid, the alkali metal hydroxides, and tertiary amines such as those heretofore mentioned being preferred. The alkaline substance introduced at this point of the process is permanently retained by the resin whereas that used in the steeping liquid may be largely or completely removed in the finished resin. For this reason the choice of alkaline substances at this point should be more carefully made to avoid the selection of a substance that might be harmful to the resin.

The following examples are given to illustrate specific embodiments of the invention:

*Example I.*—A polyvinyl butyral resin, precipitated by the pouring of an alcoholic reaction batch into water, is washed with water until the content of alcohol of the slurry liquid is less than 5% by weight. The constitution of this resin may be expressed in percentages by weight as follows:

| | Per cent |
|---|---|
| Polyvinyl acetate | 0.5 |
| Polyvinyl alcohol | 19.5 |
| Polyvinyl butyral | 80.0 |

The precipitated resin, 100 pounds dry weight, is suspended in 86 gallons of water and sufficient sodium hydroxide is added to bring the pH of the liquid up to about 10.5. Methanol is added in quantity sufficient to give a mixture of approximately 57% of methanol by weight. The slurry of resin in steeping liquid is now maintained at a temperature of 50° C. for 90 minutes, with vigorous agitation. The apparent pH of the liquid, as indicated by "La Motte Purple," is maintained between 9.0–10.0 throughout this period by the addition of sodium hydroxide as needed.

The slurry is then cooled to below 40° C. and drained. The precipitate is agitated with fresh water and again drained, and this is repeated until the percentage of methanol in the wash liquid has been reduced at least as far as 5% by weight. At this point sufficient dilute aqueous sodium hydroxide is introduced to bring the pH to a steady value of between 8.0 and 9.0. The resin is then filtered and dried at a temperature not in excess of 75° C.

In this example and in the following examples the draining and rinsing is carried out by allowing the slurry to drain until there is left about 1.0–0.8 gallon of liquid per pound of resin; further draining beyond this ratio takes unduly long. The mixture is then restored to approximately its original volume by the addition of water, and the whole is stirred. Draining and replenishment are repeated as many times as may be necessary.

*Example II.*—The exact procedure of Example I was followed except that sodium hydroxide was replaced by triethanolamine in the final wash.

*Example III.*—The procedure of Example I is followed except that the pH is initially adjusted to 9.0 instead of 10.5 and is maintained at an apparent value of 8.0, instead of 9.0–10.0, for a period of 8 hours or more at room temperature.

*Example IV.*—One thousand pounds of precipitated polyvinyl butyral resin having the following analysis:

| | Per cent |
|---|---|
| Polyvinyl acetate | 0.7 |
| Polyvinyl alcohol | 18.3 |
| Polyvinyl butyral | 81.0 | is slurried by active agitation in 860 gallons of water containing enough potassium hydroxide to give a pH of 8.5. To this is added methanol in quantity sufficient to produce a mixture of approximately 55% of methanol by weight.

There is then added to this slurry approximately 3.0 pounds of potassium hydroxide which is the amount estimated, on the basis of analysis of the crude resin, as necessary to neutralize all of the acid retained therein.

The temperature of the slurry is raised to 50° C. and maintained at that point for 90 minutes, agitation being continued throughout. The batch is then cooled and the methanol removed by successive partial drains and additions of water until the slurry contains only about 1% methanol. At this point the pH of the liquid is about 7.5–8.5. The resin is then drained completely and dried.

*Example V.*—A polyvinyl butyral resin having the following anaysis:

| | Per cent |
|---|---|
| Polyvinyl acetate | 0.6 |
| Polyvinyl alcohol | 19.7 |
| Polyvinyl butyral | 79.3 | is prepared in methanol and partially precipitated by the addition of water. This mixture is then run into a 40% by weight methanol solution resulting in a liquid medium containing 50%, by weight, methanol. The 40% solution of methanol contained enough potassium hydroxide to neutralize the acid present in the resin, and to raise the apparent pH to between 9.0 and 10.0, as indicated by "La Motte Purple." This alkalinity is maintained while the slurry is vigorously agitated for 2 hours at room temperature. The slurry is then drained and rinsed repeatedly until the liquid contains not more than about 1% of methanol. At this point sufficient dilute aqueous potassium hydroxide is introduced to raise the pH to a steady value of between 8.0 and 8.5. The resin is then separated and dried.

*Example VI.*—A polyvinyl acetal resin is prepared by condensation of a partially hydrolyzed polyvinyl acetate with benzaldehyde, in tertiary butanol as the solvent, and partially precipitated by the addition of water. This mixture is then poured into a 50% by weight tertiary butanol solution resulting in a liquid medium containing 60% by weight tertiary butanol. The 50% tertiary butanol contained enough sodium hydroxide to maintain alkalinity during the precipitation. The analysis of the resin is:

| | Per cent |
|---|---|
| Polyvinyl acetate | 0.5 |
| Polyvinyl alcohol | 40.0 |
| Polyvinyl benzal | 59.5 |

To the slurry is added sufficient sodium hydroxide to maintain an apparent pH of from 9.0–10.0 during a vigorous agitation for 3 hours at 75–80° C. The resin is then drained as nearly completely as practical and rinsed with water until practically all of the butanol has been removed. The final rinse water is tested with the indicator phenolphthalein, and its pH adjusted, if necessary, to a steady value of 8.5. The resin is then drained and dried at a temperature not exceeding 90° C.

*Example VII.*—A resin is prepared by condensing a partially hydrolyzed polyvinyl acetate with formaldehyde, in methanol as the reaction vehicle. It is precipitated by admixture with water and the precipitate washed until the methanol content of the slurry is reduced to 5% by weight. The resin is now stirred in a 50% aqueous methanol solution for 1½ hours at 50° C., the solution containing sufficient sodium hydroxide to give an apparent pH of 10.0. The slurry is next cooled to 40° C., partially drained, and then rinsed with successive portions of cold water until the liquor is substantially free from methanol.

The last rinse water is adjusted to a pH of 8.0–9.0 by the addition of a suitable quantity of dilute sodium hydroxide solution. The resin is then drained and dried.

*Example VIII.*—A polyvinyl ketal resin prepared by condensing polyvinyl alcohol and cyclohexanone, and containing 19% polyvinyl alcohol, by weight, is precipitated from alcohol by admixture with water. The precipitated resin is successively drained and slurried with water until the concentration of alcohol is reduced to about 5% by weight. The resin is then agitated with 45% aqueous acetone containing sufficient potassium hydroxide to maintain an apparent pH of 9.0–9.5 during 2½ hours at 45–50° C.

The slurry is then cooled and drained, and rinsed with water until the specific gravity of the supernatant liquid is at least 0.99. The final rinse water is adjusted to a pH of 8.3 by the addition of a suitable amount of dilute potassium hydroxide solution. The drained resin is then dried in air at 60–65° C.

*Example IX.*—The procedure of Example VIII is followed except that the acetone-water slurry is replaced by a dioxan-water mixture containing 50%, by weight, dioxan. In this instance the steeping treatment was completed in 1½ hours at 60–65° C. The subsequent steps are as in Example VIII.

It will be understood that the above examples are merely illustrative and the invention broadly resides in steeping the finely divided resin with active agitation in an alkaline steeping agent while the resin particles are in a softened and swollen state and, thereafter, rinsing the resin with water under such conditions that a residue of an alkaline substance is left associated with the resin.

The stabilizing treatment, as shown in the examples, is generally applicable to polyvinyl acetals made by condensing either an aldehyde or a ketone with polyvinyl alcohol or with a partially hydrolyzed polyvinyl ester regardless of the specific degree of condensation or the specific degree of hydrolysis of the polyvinyl ester. Obviously, the resin treated must be substantially water insoluble and the hydrolysis of the polyvinyl ester and the condensation of aldehyde or ketone with the hydroxyl groups of the polyvinyl compound must be sufficient to give a product that can be fairly considered a polyvinyl acetal resin. The treatment is particularly advantageous with respect to polyvinyl butyrals having about 18% polyvinyl alcohol, by weight, i. e., a polyvinyl alcohol in which about 71% of the hydroxyl groups have been reacted with n-butyraldehyde.

The chief considerations in determining the selection and proportion of the components of the steeping liquid have been discussed above. While there are many suitable water-miscible solvents for the resin and alkaline substances other than the ones specifically mentioned, the ones mentioned are preferred and it is believed will ordinarily prove the most practical.

To reduce the time required for the steeping treatment to the minimum without risking injury to the resin, agglomeration of resin particles and the like, a steeping liquid comprising, beside the requisite amount of alkaline substance, water and methanol, the latter amounting to at least 50% by weight of the steeping liquid and, preferably, between 50–60% by weight thereof, is advantageously used at a temperature of around 45–55° C. The following example illustrates the advantage of using a relatively concentrated methanol solution:

*Example X.*—Three samples of the same polyvinyl butyral resin were subjected to a steeping treatment with agitation for 2½ hours at 50° C. in methanol-water mixtures containing, by weight, respectively, 50%, 40%, and 30% methanol. The pH in each instance was maintained at about 9.5 by addition of potassium hydroxide. At the end of the treatment the resins were drained, washed, and dried under identical conditions. They were then submitted to the stability test. The resin that had been treated with the 50% methanol solution showed no discoloration; that treated with the 40% methanol solution showed some discoloration, and that treated with the 30% methanol solution showed even more discoloration.

The above example is simply to illustrate the increased efficiency of the more concentrated methanol solution; with a longer period of treatment the latter two samples would have been stabilized satisfactorily.

By the use of higher temperatures the steeping period may likewise be reduced to a certain extent. However, in instances where a resin of low softening point is being stabilized, the use of materially elevated temperatures is precluded and, in general, it is not advisable to employ a temperature appreciably above 60° C. due to the danger of agglomeration of the resin particles nor is it economical.

The particle size of the crude resin will depend chiefly upon the manner in which the precipitation of the resin from the solution is conducted. It is desirable that the resin in a batch be of approximately uniform particle size as the time required for stabilization of the batch as a whole is governed by the time required to complete the stabilization of the coarsest particles therein.

The duration of the steeping treatment specified in the examples are for resins of such particle size that the greater part passes a 20-mesh screen and is retained upon an 80-mesh screen. Coarser resins will require correspondingly longer times while finer resins can be stabilized in somewhat shorter times than those specified in the several examples.

It is not material in the ultimate effect what conditions prevail in the rinsing of the resin to leave it with an alkaline substance associated with it in an amount such that the resin is in equilibrium with water of a pH between 7.5 and 10.0. The simplest methods of accomplishing this seem to be to add an alkaline substance to the water in the last rinse or to regulate the rinses so that the requisite amount of alkaline substance absorbed from the steeping liquid, is left in.

An advantage of the present invention is that it provides a simple and economical method of removing impurities, particularly acid catalysts and aldehydes, from crude polyvinyl acetal resins without, in itself, contributing any injurious substances to the resin. Further, a new, refined resin greatly improved in color, clarity, and stability is readily obtained. Due to the alkaline substances associated with the finished resin, the stability of the resin is appreciably improved beyond what simple removal of impurities could attain. A very practical advantage of the invention is that it provides a way to soften and swell the resin to facilitate the removal of impurities without danger of agglomeration of the resin particles and gives a resin which can be dried without trouble due to caking.

As many apparently widely different embodiments of this invention may be made without departing from the spirit and scope thereof, it is to be understood that the invention is not limited to the specific embodiments thereof except as defined in the appended claims.

We claim:

1. In a process of treating a crude polyvinyl acetal resin the step comprising steeping said resin, in finely divided form, in a steeping liquid comprising a mixture of water and a water-miscible solvent for the said resin and an alkaline substance from the group consisting of alkali metal hydroxides and tertiary amines, dissolved therein in a quantity to produce and maintain in said steeping liquid an apparent pH of at least 7.5, with active agitation and at a temperature adapted to effect softening and swelling of said resin in said steeping liquid and cause agglomeration of said resin in the absence of active agitation but not in the presence of active agitation, said temperature not exceeding 60° C.

2. In a process of treating a crude polyvinyl acetal resin the step comprising steeping said resin, in finely divided form, in a steeping liquid comprising a mixture of water and a water-miscible solvent for the said resin and an alkali metal hydroxide dissolved therein in a quantity to produce and maintain in said steeping liquid an apparent pH of 7.5–10.0, with active agitation and at a temperature adapted to effect softening and swelling of said resin in said steeping liquid and cause agglomeration of said resin in the absence of active agitation but not in the presence of agitation, said temperature not exceeding 60° C.

3. In a process of treating a crude polyvinyl acetal resin the step comprising steeping said resin, in finely divided form, in a steeping liquid comprising a mixture of water and methanol, the methanol amounting to 25%–60%, by weight, of said liquid, and an alkaline substance from the group consisting of alkali metal hydroxides and tertiary amines, dissolved therein in a quantity to produce and maintain in said steeping liquid an apparent pH of 7.5–10.0, with active agitation and at a temperature adapted to effect softening and swelling of said resin in said steeping liquid and cause agglomeration of said resin in the absence of active agitation but not in the presence of agitation, said temperature not exceeding 60° C.

4. In a process of treating a crude polyvinyl acetal resin the step comprising steeping said resin, in finely divided form, at a temperature of about 50° C. in a steeping liquid comprising a mixture of water and methanol, the methanol amounting to 40–60%, by weight of said liquid, and an alkaline substance from the group consisting of alkali metal hydroxides and tertiary amines, dissolved therein in a quantity to produce and maintain in said steeping liquid an apparent pH of 7.5–10.0, with active agitation.

5. In a process of treating a crude polyvinyl butyral resin the step comprising steeping said resin, in finely divided form, at a temperature of about 50° C., in a steeping liquid comprising a mixture of water and methanol, the methanol amounting to 50–60%, by weight of said liquid, and an alkaline substance from the group consisting of alkali metal hydroxides and tertiary amines, dissolved therein in a quantity to produce and maintain in said steeping liquid an apparent pH of 7.5–10.0, with active agitation.

6. Process of treating a crude polyvinyl acetal resin which comprises steeping said resin, in finely divided form, in a steeping liquid comprising a mixture of water and a water-miscible solvent for the said resin and an alkaline substance from the group consisting of alkali metal hydroxides and tertiary amines, dissolved therein in a quantity to produce and maintain in said steeping liquid an apparent pH of at least 7.5, with active agitation and at a temperature adapted to effect softening and swelling of said resin in said steeping liquid and cause agglomeration of said resin in the absence of active agitation but not in the presence of active agitation, said temperature not exceeding 60° C., and thereafter rinsing said resin with water to remove solvent, the conditions of said rinsing being such that a residue of an alkaline substance is left associated with said resin in such amount that said resin will be in equilibrium with water of a pH between 7.5 and 9.0.

7. In a process of treating a crude polyvinyl butyral resin which comprises steeping said resin, in finely divided form, in a steeping liquid comprising a mixture of water and methanol, the methanol amounting to at least 50%, by weight, of said liquid, and an alkali metal hydroxide dissolved therein in quantity to produce and maintain in said steeping liquid an apparent pH of 7.5–10.0, with active agitation and at a temperature adapted to effect softening and swelling of said resin in said steeping liquid and cause agglomeration of said resin in the absence of active agitation but not in the presence of active agitation, said temperature not exceeding 60° C., and thereafter rinsing said resin with water to remove solvent, the conditions of said rinsing being such that a residue of an alkaline substance is left associated with said resin in such amount that said resin will be in equilibrium with water of a pH between 7.5 and 9.0.

8. In a process of treating a crude polyvinyl acetal resin which comprises steeping said resin, in finely divided form, in an alkaline steeping liquid adapted to effect softening and swelling of said resin but not agglomeration of said resin, the alkaline substance in said steeping liquid being from the group consisting of alkali metal hydroxides and tertiary amines, and thereafter rinsing said resin with water, the conditions of said rinsing being such that a residue of an alkaline substance is left associated with said resin in such amount that said resin will be in equilibrium with water of a pH between 7.5 and 9.0.

9. In a process of treating a crude polyvinyl acetal resin which comprises steeping said resin, in finely divided form, in an alkaline steeping liquid adapted to effect softening and swelling of said resin but not agglomeration of said resin, the alkaline substance in said steeping liquid being from the group consisting of alkali metal hydroxides and tertiary amines, and thereafter subjecting said resin to a plurality of rinses with water, the conditions of said rinsing being such that a residue of an alkali metal substance is left associated with said resin in such amount that said resin will be in equilibrium with water of a pH between 7.5 and 9.0.

10. In a process of treating a crude polyvinyl butyral resin which comprises steeping said resin, in finely divided form, in an alkaline steeping liquid adapted to effect softening and swelling of said resin but not agglomeration of said resin, the alkaline substance in said steeping liquid being from the group consisting of alkali metal hydroxides and tertiary amines, and thereafter rinsing said resin with water, the conditions of said rinsing being such that a residue of an alkaline substance is left associated with said resin in such amount that said resin will be in equilibrium with water of a pH between 7.5 and 9.0.

11. In a process of treating a crude polyvinyl butyral resin which comprises steeping said resin, in finely divided form, in an alkali metal hydroxide steeping liquid adapted to effect softening and swelling of said resin but not agglomeration of said resin, and thereafter subjecting said resin to a plurality of rinses with water, the conditions of said rinsing being such that a residue of an alkali metal substance is left associated with said resin in such amount that said resin will be in equilibrium with water of a pH between 7.5 and 9.0.

JOHN H. HOPKINS.
GEORGE H. WILDER.

CERTIFICATE OF CORRECTION.

Patent No. 2,282,057. May 5, 1942.

JOHN H. HOPKINS, ET AL.

It is hereby certified that error appears in the printed specification of the above numbered patent requiring correction as follows: In the heading to the printed specification, line 5, name of assignee, for "du Point" read --du Pont--; and that the said Letters Patent should be read with this correction therein that the same may conform to the record of the case in the Patent Office.

Signed and sealed this 15th day of September, A. D. 1942.

(Seal)

Henry Van Arsdale,
Acting Commissioner of Patents.